3,429,636
ELECTRO-OPTICAL LIGHT MODULATION MEANS
USING BIREFRINGENT CRYSTALS
John L. Wentz, Randallstown, Md., assignor to Westinghouse Electric Corporation, Pittsburgh, Pa., a corporation of Pennsylvania
Filed Feb. 7, 1964, Ser. No. 343,319
U.S. Cl. 350—160
Int. Cl. G02f 1/28; H04b 9/00
7 Claims

ABSTRACT OF THE DISCLOSURE

Herein is described an electro-optical modulator or light valve in which two birefringent crystals, having substantially the same index of refraction, are arranged in light-transmitting relation with the respective optic axes of the crystals in orthogonal relation. The Z-axes of both crystals are at right angles to the optical axis which is determined by the coaxial alignment of one of each of the axes of the respective crystals. The modulation voltage is applied across a crystal with the electric vector parallel to the Z-axis of the crystal. The modulation voltage can be applied across one crystal only or across both crystals simultaneously. Since the phase shift is proportional to the length of the crystal the same phase shift can be obtained with a lower modulation voltage when the latter is applied to both crystals. Natural birefringence is cancelled by the orthogonal arrangement of Z-axes. The light valve action is obtained by means of an analyzer in the optical path. In the embodiment of FIG. 2 the device is illustrated as being applied to a laser optical cavity wherein the laser output is polarized and no separate analyzer is needed. The laser medium serves as the polarizer for light propagated in one direction and as the analyzer for the reflected light.

---

This invention relates to improvements in electro-optical light modulation means and more particularly to improvements for modulating the output energy of a laser.

Because lasers rely for their operation upon the quantized energy states of matter, they have an inherent tendency to operate at fixed output levels and frequencies. Such fixed states of operation place rather severe limits upon the means for controlling, or modulating the output of lasers. The fundamental nature of the quantization and the stimulated emission has been known since the early part of this century but masers and lasers were not developed until it was learned how to develop negative thermal temperatures in materials and how to provide the necessary regenerative feedback in the system to induce the coherent stimulated emission from the electrons of the active material. In some modulation systems for lasers, modulation is accomplished by varying the power input. In others, this is accomplished by varying the amplitude of the external output. There are other prior art systems in which modulation takes place internal to the resonant optical cavity.

The present invention is directed to novel and improved means for modulating light energy and is particularly adapted for incorporation into the resonant cavity of a laser to effect modulation of the output by controlling or modulating the regenerative feedback within the laser optical cavity. Electro-optical light modulation systems using a Kerr cell or a Pockel's cell have heretofore been used to modulate the output of lasers. Kerr cells, in general, are undesirable, and a particular disadvantage of the prior Pockel's cell systems is that the incident light and modulating field was parallel to the optical axis of the uniaxial crystals. The electrodes necessary to establish the electrical field parallel to the optical path absorb optical energy, causing very critical losses. Electrode heating is also produced by high frequency modulating fields and can cause permanent damage to the crystals.

In an electro-optical modulation system orthogonal components of polarized optical energy propagating along the optical axis experience retardation which is proportional to the applied modulating electric field strength. This retardation produces alteration of polarization of the optical energy so that the amount of energy passing through an analyzer can be readily controlled by varying the electric field strength.

In the conventional manner, plane polarized light is directed along the Z-, or optic, axis of a uniaxial electro-optic crystal with the plane of polarization at 45° to the X and Y principal optical axes of the crystal. Upon entering the crystal, the plane polarized light is resolved into two orthogonal components, one vibrating parallel to the X-axis and one vibrating parallel to the Y-axis. With no modulating field applied along the Z-axis, the indices of refraction are identical for light vibrating parallel to the X and Y axes. Therefore, the orthogonal components do not experience any retardation with respect to each other and upon emerging from the crystal, recombine to form a plane polarized light beam with the same orientation as the incident light beam. When a modulating field is applied to the crystal along the Z-axis, the X and Y indices of refraction are no longer the same because of internal stresses on the basic crystal structure brought about by the applied electrical field. For a given polarity of modulating field, the X index of refraction will increase and the Y index of refraction will decrease, the magnitude of change in index being the same for the X and Y axes and directly proportional to the applied electric field. The orthogonal components of incident plane polarized light will now undergo a phase shift with respect to each other and upon emerging from the electro-optic crystal will recombine to form an elliptically polarized beam with eccentricity dependent upon the amount of induced phase shift between the orthogonal components. For a particular modulating field, the emerging components will possess a phase difference of $\pi$ radians and will recombine to form a plane polarized light beam with the plane of polarization orthogonal to the input polarization. The voltage required to produce the necessary modulating field to induce a $\pi$ radian phase shift in the emerging light beam components is termed the half wave voltage. By suitable placement of an analyzer, the alteration in polarization can be converted to amplitude modulation of the light beam.

By placing the above discussed crystal in the Fabry-Perot resonant optical cavity of a laser which emits only plane polarized radiation, the attenuation to the feedback in the cavity can be such as to switch the cavity from a resonant to a non-resonant condition by changing the Q of the cavity. Since this attenuation is a linear function of the voltage continuous, as well as pulsed, modulation can be provided.

From the above, it is seen that the present invention relates to electro-optical devices which can be readily applied to the optical cavity of lasers in such a manner that the electro-optical device controls the Q of the cavity. Such method of controlling or modulating the operation of the laser is commonly referred to as "Q-spoiling." Heretofore, in Q-spoiling modulation systems in lasers rotating reflectors, Kerr cells, and conventional electro-optic light shutters have been used.

In accordance with the present invention, instead of using the electro-optic crystals in the conventional manner, an electro-optical light modulating system is provided utilizing two identical electro-optic crystals, positioned with the X-axis of one crystal and the Y-axis of the other crystal along the light path, a modulating voltage being applied simultaneously along the Z axes of the two crystals to control the polarization of the transmitted light.

An illustrative embodiment of the invention comprises a system in which the novel electro-optical system is incorporated in a laser optical resonant cavity to control, or modulate, the propagation of polarized light between the ends of the optical cavity, thus modulating the output of the laser. Whereas, in the case of the conventional electro-optic shutter, the phase shift of the polarization is depended only upon the voltage, in the present invention, utilizing the arrangement of the two electro-optic crystals, the phase shift can be increased by a factor depending upon the ratio of the longitudinal to the transverse dimension along which the modulating fields are applied for a given voltage, thereby greatly reducing the voltage required to effect a certain polarization change, that is, provide a more effective modulation control of the laser output.

A primary object of the invention is to provide a novel and improved electro-optical light modulation means.

Another object is to provide a novel and improved electro-optical light modulation system in which the electrodes, necessary to establish the electric field are in a plane parallel to the light path so as to establish an electric field transverse to the light path.

Another object is to provide an improved electro-optical light modulation system employing electro-optical crystals each having an optic axis along which the index of refraction remains unchanged while the indices of refraction along the other axis change when subjected to an electric field.

Another object is to provide a novel and improved means for modulating the output of a laser which will have increased efficiency.

Another object is to provide a novel and improved means for modulating the output of a laser by providing a more efficient means for varying the Q of the optical cavity of the laser.

Another object is to provide novel and improved means internal to the optical cavity of a laser to modulate the laser output energy.

A further object is to provide new and improved means for modulating the laser in which the effectiveness of the modulation voltage can be increased by a factor of the ratio of the longitudinal to the transverse dimension of the electro-optic crystals arranged in the light propagation path in the optical cavity.

The invention itself, however both as to its organization and method of operation, as well as additional objects and advantages, will best be understood from the following description when read in connection with the accompanying drawing, in which:

FIG. 1a is a graphical representation of the relation between the crystal principal optical axes and the phase of the different light vectors.

Briefly, the present invention provides an improved electro-optical light modulating means, particularly adapted for use in modulating the Q of the resonant cavity of a laser. The means is capable of effecting continuous variation of the transmission of light or of effecting pulse modulation thereof. The system is capable of operating at very high speed in the manner of an "on-off" switch to abruptly cut off, or on, the light energy circulated in the laser optical cavity to sustain or abruptly interrupt laser action.

An illustrated embodiment of the present invention takes the form of a light modulation system comprising a pair of suitable electro-optical crystals of the dihydrogen phosphate type, such as potassium dihydrogen phosphate (KDP) positioned in the light path in the Fabry-Perot resonant cavity of a laser, between the reflecting ends of the cavity, with the X-axis of one crystal and the Y-axis of the other crystal parallel to the path of the light. Preferably these are of a particular orientation such that the electric fields are applied to the crystals transversely to the light path and along the respective Z-axes of the crystals. This type of crystal is birefringent but has the property of retaining a constant index of refraction along their Z-axis (or optic axis) when electric fields are applied along the Z-axis, while possessing an electro-optical effect along their other two axes whereby the crystalline birefringence is changed when a field is applied to the Z-axis of the crystal.

A source of light, in the illustrated embodiment a source of coherent optical energy which is linearly polarized by the nature of the active solid material used, is directed along the longitudinal axes of the two crystals. The two crystal system has all of the properties of the optical axis in conventional electro-optic shutters employing the Pockel's effect. However, by the application of the proper dimensioning of the crystals and by applying the appropriate electric field, dependent upon the crystal dimensions as hereinafter more fully explained, it is possible to produce a $\pi$ radians phase change between the emerging components of linearly polarized input light. Under this condition, the resultant output polarization is rotated 90° with respect to the polarized input. If this invention was being used, simply as a light modulator or light shutter, an appropriate analyzer would be associated with the emergent light to effect light modulation. However, in the illustrated embodiment, a light modulator in accordance with the present invention is operably associated with the optical cavity of a laser wherein the rod of laser medium is polarized. Since the laser crystal amplifies and oscillates for only a particular plane of polarization, the electro-optic modulator is able to control the amount of light which is regeneratively coupled back into the laser medium.

Figure 1:
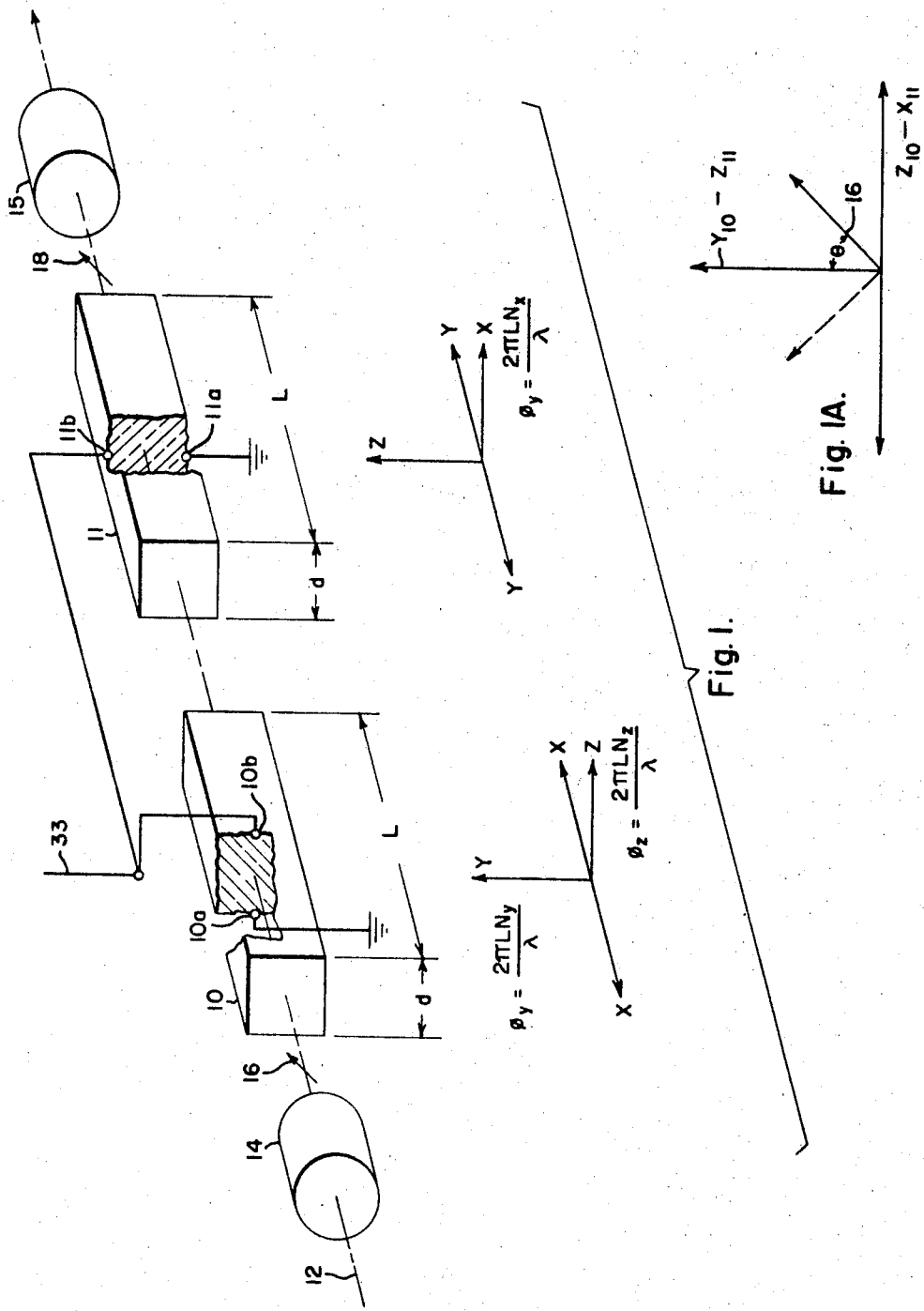
FIGURE 1 is a schematic illustration of an electro-optical device utilizing the Pockel's effect incorporated into one embodiment of the present invention.

In the illustrated embodiment of the invention of FIGURE 1, two elongated parallelepiped birefringent electro-optical crystals 10 and 11 are arranged with the X-axis of crystal 10 and the Y-axis of crystal 11 in coaxial alignment. Preferably, although not necessarily, the elongated crystals 10 and 11 have a square cross section. They may have a rectangular cross section as long as the dimensions along the respective Z-axes are the same. The physical axis of each rod should lie in, or be perpendicular to, the 110 plane of the crystal and also be parallel to the X–Y plane. In accordance with the basic aspect of the invention, pertaining to a light modulating system or light shutter, the electro-optical crystals may be associated with any suitable source of light providing a light beam represented at 12 which is arranged to pass through a linear polarizing element 14 before entering the first crystal 10. The basic light modulating system includes an analyzer element 15 with its polarization crossed to that of the polarization of the polarizing element 14. To complete the electro-optical light modulating device, it is necessary to provide a source of electrical potential between the longitudinal sides of the crystals so that the electric field is parallel to the Z-axis. In the illustrated embodiment, this potential would be applied across the terminals 10a and 10b of the crystal 10 and terminals 11a and 11b of the crystal 11. It is to be noted that the Z-axes of the two crystals are arranged at right angles to each other as well as to the axis of the light ray.

Before proceeding with the description of the illustrated embodiment of the invention in which the optical modulator is incorporated in a laser, a brief outline of the theory of operation of the invention is appropriate.

Crystals of the dihydrogen phosphate type, referred to above and, of which crystals 10 and 11 are examples, are uniaxial crystals, that is, they have one axis, the optic axis, along which no phase retardation takes place when the light passes parallel to this axis. The electro-optical effect in crystals is the result of the induced birefringence which occurs when an electric field is applied to the crystal along a particular axis. Birefringency is a consequence of anisotropy in the crystal indices of refraction along the principal crystal axes. Birefringent crystals are best described in terms of the Fresnel index ellipsoid which has axes proportional to the principal indices of refraction in the crystal. Plane polarized light incident upon a birefringent crystal will experience double refraction and phase retardation between the orthogonal components of the incident light vibrating along the principal optical axes in the crystal. In uniaxial crystals, two of the indices of refraction in the ellipsoid are equal. Therefore, no birefringence occurs for light propagating perpendicular to the plane of the equal indices. This propagation direction determines the optic axis of the crystal. Crystals in which the principal indices are unequal are biaxial, that is, they have two optic axes. Electro-optic crystals, which are normally uniaxial become biaxial when an electric field is applied parallel to the Z-axis. In this instance, the indices of refraction for light vibrating parallel to the X and Y axes is altered by applied voltage and the X and Y indices are no longer equal.

With the above brief background, reference is made to FIGURE 1a which graphically depicts the fact that the plane of polarization of the light emerging from the polarizing device 14, which may be represented by the vector 16, is at 45° with respect to the Y and Z axes of crystal 10 and 45° with respect to the Z and X axes of crystal 11. Assuming the plane of polarization, as indicated by the arrow 16, the following phase relationships are characteristic of the polarization of the orthogonal components of plane polarized light propagating along the axis 12 of the system. Let $N_x$, $N_y$ and $N_z$ be the principal indices of refraction for the X, Y and Z crystal axes and let L be the length of the crystals along the light path. Also let $d$ represent the dimension of the crystals transverse to the longitudinal axis. Since the crystals have a square cross section, the dimension $d$ will always be parallel to the Z axes of the respective crystals. Let $\lambda$ be the wave length of the incident radiation represented by the light beam 12.

In passing through the crystal 10, along the X axis of that crystal, the Y component of the polarization undergoes a phase change of $$\phi_y = \frac{2\pi L}{\lambda} N_y \quad (1)$$

radians and the component parallel to the Z axis undergoes a phase change of $$\phi_z = \frac{2\pi L}{\lambda} N_z \quad (2)$$

radians. The phase change resulting from the air gap between the two crystals 10 and 11 is the same for each component and will be expressed as a constant, $\alpha$. In passing through crystal 11 along the Y axis of the latter, the X component of the polarization undergoes a phase change of $$\phi_x = \frac{2\pi L}{\lambda} N_x \quad (3)$$

radians and the component parallel to the Z axis undergoes a phase change of $$\phi_z = \frac{2\pi L}{\lambda} N_z \quad (4)$$

radians. The total phase change for the X and Y components in passing through both crystals is $$\theta_x = \phi_x + \phi_z + \alpha = \frac{2\pi L}{\lambda}(N_x + N_z) + \alpha \quad (5)$$

and $$\theta_y = \phi_y + \phi_z + \alpha = \frac{2\pi L}{\lambda}(N_y + N_z) + \alpha \quad (6)$$

respectively. The phase difference between the two components is $$\Delta\theta = \theta_x - \theta_y = \frac{2\pi L}{\lambda}[[N_x + N_z] - (N_y + N_z)] \quad (7)$$

This then becomes:

$$\Delta\theta = \frac{2\pi L}{\lambda}[N_x - N_y] \quad (8)$$

If no electric field is applied to the Z axes of the respective crystals, the indices of refraction $N_x$ and $N_y$ are equal, that is $N_x = N_y = N_0$. The phase difference between the emerging perpendicular components of the linearly polarized input ray indicated by the vector 18, is then zero, that is, $$(\Delta\theta = 0) \quad (9)$$

The original polarization of the incident light ray 12 is preserved and the emergent resultant vector 18 has the same polarization as represented by the arrow 16.

When an electric field is applied along the Z axis of the two crystals, that is, when electric potential is applied to the electrodes 10a and 10b of crystal 10 and 11a and 11b of crystal 11 the index of refraction $N_x$ and the index of refraction $N_y$ of the two crystals are no longer equal. But significantly, the index of refraction $N_z$ along the Z axis of the crystal remains unchanged. When the electric field is applied to these crystals, one of the indices increases while the other decreases. This may be represented as $$N_x = N_0 \pm \Delta N \quad (10)$$

and $$N_y = N_0 \mp \Delta N \quad (11)$$

where $\Delta N$ is the change in index of refraction brought about by application of the electric field. It has been determined by others that $$\Delta N = \frac{r_{63} V_z N_0^3}{2d} \quad (12)$$

Substituting the value of $N_x$ and $N_y$ in Equation 8 gives $$\Delta\theta = \frac{2\pi L r_{63} V_z N_0}{\lambda d} \quad (13)$$

where $r_{63}$ is an electro-optic constant and where $V_z$ is a voltage applied along the Z axis.

In accordance with this invention, it has been determined that by the application of the proper voltage to the Z axes of the two respective crystals 10 and 11 and the voltage being properly related to the longitudinal and transverse dimensions of the crystals, it is possible to cause the linear components of the input light ray emerging from the right-hand end of the crystal 11 to have a $\pi$ radians phase difference, that is, $$\Delta\theta = \pi \quad (14)$$

In this latter condition, the incident ray 12 will have its plane of polarization rotated 90° when it emerges from the right-hand end of crystal 11.

The required voltage to cause a 90° rotation of the input polarization ray may be determined by substituting the values $N_x = N_0 + \Delta N$ and $N_y = N_0 - \Delta N$ in Equations 10 and 11, respectively, and the value of $\Delta\theta = \pi$ in Equation 14 into Equation 8. Solving this, gives $$V_z = \frac{\lambda d}{2 r_{63} N_0^3 L} \quad (15)$$

Since the factor $$\frac{\lambda}{2 r_{63} N_0^3}$$

is recognized as the half-wave voltage, that is, the voltage necessary to produce a $\pi$ radians phase displacement between the emergent components of the incident ray when an electric field is applied parallel to the Z axis and when the light is also parallel to the Z axis. Therefore, a reduction in the half-wave voltage by a factor of $L/d$ is accomplished by the present invention over the system in which the light rays are propagated along the Z axis. Since it is possible to produce a polarization rotation between the incident and emergent rays of 90° by appropriate voltages, a complete light shutter effect can be produced. It is obvious that modulation of light in a continuous manner from a maximum to a minimum is possible.

A significant feature of the above discussion is to show that the modulating or light shutter action can be accomplished in a system shown in FIG. 1 in which the light is directed along either the X- or Y-axis instead of along the Z axis where the prior art teaches that it should be directed in order to accomplish a result similar to that of this invention although in a more inefficient manner. The real significance of this is that the electrodes on the crystals 10 and 11 to which the modulating voltages are applied are on the longitudinally extending sides of the crystals, that is, the electric field is applied transversely to the light path, where there is no interference with the light beam 12 so that a minimum of the optical energy is absorbed in the transmission path.

Figure 2:
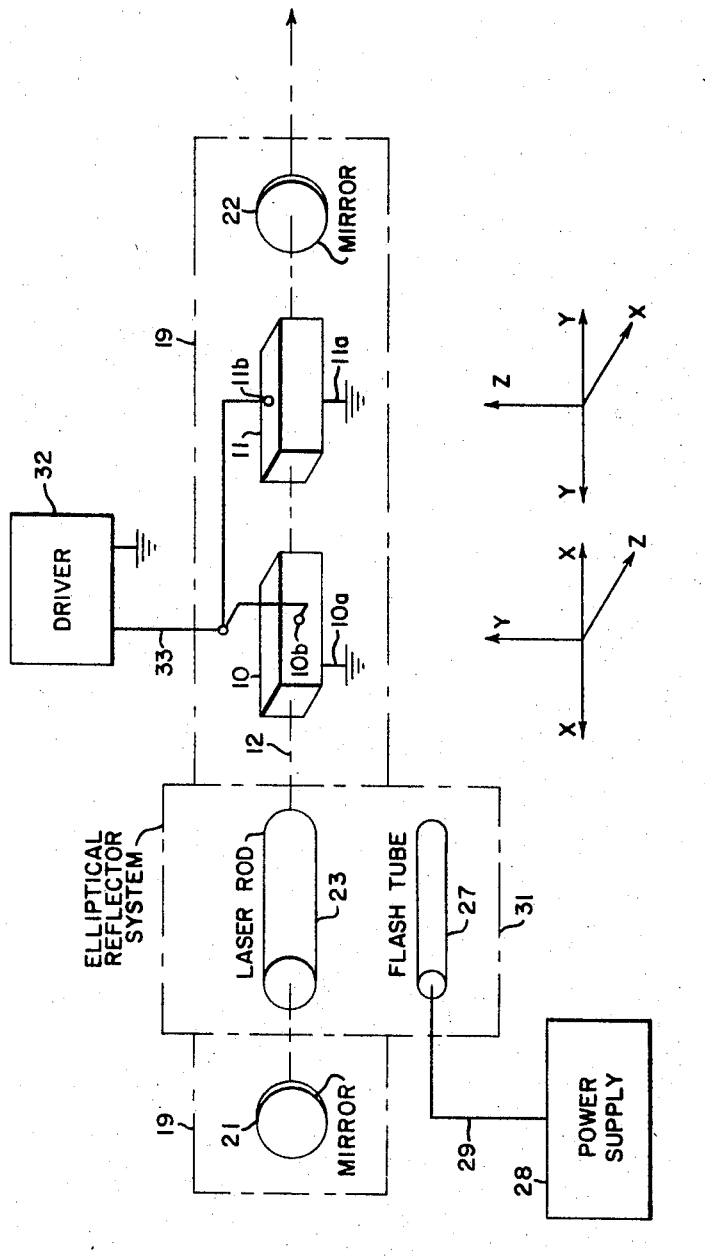
FIG. 2 is a schematic illustration of one embodiment of the present invention as incorporated in a laser cavity.

FIGURE 2 schematically illustrates an embodiment of the invention in which the inventive concept described above is applied as a Q-spoiling modulation system for a laser. The Fabry-Perot resonant cavity of the laser comprises two boundary mirrors 21 and 22 between which is positioned a suitably energized rod of active laser material adapted to emit linearly polarized coherent light. The rod 23 is preferably a 90° oriented uniaxial laser crystal, that is, the crystallographic Z-axis is perpendicular to the longitudinal axis of the rod which causes it to emit linearly polarized light for input energies below a critical value. Therefore, in accordance with the inventive concept described above, in the illustrative embodiment of FIG. 2, the laser rod 23 would be so positioned around its longitudinal axis so that the light emerging from the right-hand end of the rod 23 would be positioned at 45° with respect to the respective Z axis of the crystals 10 and 11 as illustrated in FIGS. 1 and 1a. It will be obvious that in the embodiment of FIG. 2 since the light output from the laser rod 23 is linearly polarized it is not necessary to utilize the polarizing unit 14 of FIG. 1. The crystals 10 and 11 in FIG. 2 are identical with those previously described. Also, in the embodiment in FIG. 2, it is not necessary to employ the analyzer 15 because in the resonant cavity 19 of the laser the light energy emerging from the right-hand end of the crystal 11 in FIG. 2 is reflected by the mirror 22 back through the modulating system. From what has preveiously been said, it will be obvious that the amount of light energy which is able to return from the mirror 22 and reenter the right-hand end of laser rod 23 will be dependent upon the instantaneous modulating voltage on the crystals 10 and 11 which determines how much phase shift has taken place in the original light beam which originally emerged from the linearly polarized rod 23. Also it should be noticed that only one-half of the calculated half-wave voltage for the two crystal system is required to rotate the plate of polarization 90° in the cavity. This is because the light beam makes two passes through the electro-optic modulator crystals.

In accordance with conventional practice in the laser art, the reflecting surfaces of the mirrors 21 and 22 are positioned with a very high degree of parallelity. The surface of the mirror 21 is substantially totally reflective while the other mirror is partially reflective or alternatively is provided with a central aperture which provides an output iris for coherent light energy represented by the light beam at 26. In accordance with conventional practice, any suitable means may be provided for energizing the laser rod, such as by a flash tube 27, which in turn is energized from a suitable power supply 28 over the power connection 29.

In the embodiment of FIG. 2, the crystals 10 and 11 are arranged between the rod 23 and the mirror 22 in a manner analogous to the arrangement of the same crystals 10 and 11 of FIG. 1 with respect to the polarizer 14 and the analyzer 15. The terminals 10a and 11a are connected to ground while the terminals 10b and 11b are connected to a source of potential which in the present instance may be a suitable modulating voltage or a driver 32 by means of the lead 33.

Since the Fabry-Perot optical cavity 19 of the laser serves as a positive regenerative coupling between the electrons of the active laser material when the laser rod 23 is energized by pump energy, such as the light from the flash tube 27, certain of the electrons of the rod 23 will be excited to their upper states to produce a negative temperature in the rod. As soon as this temperature inversion has developed radiative emission will take place from the rod 23 at random but in general towards the two mirrors 21 and 22.

For the purpose of assuming some operating condition, it will be first assumed that the voltage from the modulating driver 32 is zero and therefore no change in the polarization takes place from the rod 23 to the mirror 22 and therefore the light reflected from the mirror 22 will pass back into the laser rod 23. Under this condition, the Q of the resonant cavity 19 is such that sufficient regenerative feedback is provided to support lasing operation. If the laser rod 23 is excited by a short pulse of light energy from the flash tube 27, the resonant Fabry-Perot cavity will continue to oscillate until the energy of the pulse is dissipated in the losses of the system. Of course, if the laser rod 23 is continuously energized, the system will continue to lase at its maximum output in the absence of a modulating or control voltage from the modulating driver 32. Here it should be mentioned that if it is desired to produce an extra large output spike from the laser the control voltage from the modulating driver 32 may be adjusted so that the potential applied to the crystals 10 and 11 produces a 90° polarization rotation between the original output of the laser rod 23 and that emerging from the left-hand side of the crystal 11 after reflection so that the reflected light energy will be cross polarized to polarization of the rod 23 and can therefore not couple back into the electrons of the rod 23 thus putting the resonant cavity 19 into a nonresonant condition. If the laser rod 23 is then excited by excitation from the flash tube 27 energy will be stored in the energy states of the electrons of the laser rod 23 and then when the modulating voltage from the driver 32 is reduced to permit the light energy to proceed through the crystals 10 and 11 without substantial polarization alteration regenerative coupling will take place as the light energy reflected from the mirror 22 reenters the laser rod 23 effectively raising the Q of the resonant cavity 19 so that a giant spike output pulse is produced.

Since there is a linear relation between the voltage from the modulating driver 32 and the phase retardation of the light energy passing from the rod 23 to the mirror 22 continuous variation of the output from the laser cavity can be produced so that continuous variation or modulation of the output can be effected.

In an embodiment of the present invention reduced to practice, the crystals 10 and 11 were 1″ x ¼″ x ¼″ in size and optically finished to laser rod tolerances. The calculated voltage necessary to achieve a 90° rotation of a ruby laser beam ($\lambda=6943$ A.) is 1200 volts and this agreed very well with the experimental value. Under normal Q switching conditions, the crystals were biased at approximately 1100 volts, maintaining the optical shutter in the closed condition. A drawing pulse lowered the bias voltage to approximately 300 volts which was sufficient, for all practical purposes, to open the optical shutter and permit laser action.

While the invention has been illustrated in simple form in two embodiments, it will be obvious to those skilled in the art that the invention is not confined to the specific embodiments illustrated and that the inventive concept described herein can be applied in additional environments and that other changes and variations can be made without departing from the spirit of the invention. For example, other uniaxial crystals, other than the example given may be used.

I claim:

1. Light modulation apparatus for a source of polarized light having its electric vector oriented in a fixed position comprising, first and second elongated birefringent electro-optic crystals having the same index of refraction arranged in light-transmitting relationship with the respective optic axes of said crystals being effectively optically perpendicular to each other and to the optical axis determined by the coaxial alignment of one of each of the principal axes of said crystals, said crystals having the same length along said optical axis and being subjected to the same external environmental conditions, means for supplying a modulation signal voltage to said crystals with the electric fields parallel to the respective Z-axes of said crystals.

2. The combination as set forth in claim 1, and means for converting polarization modulation to intensity modulation of the light emerging from said crystals.

3. The combination as set forth in claim 1 and, means for directing along said optical axis a beam of light to be modulated, said crystals being so disposed relative to said optical axis that the electric vector of said beam of light is at 45° with respect to each of the optic axes on said crystals.

4. The combination as set forth in claim 1 and, means for directing along said optical axis a beam of light to be modulated, said crystals being so disposed relative to said optical axis that the electric vector of said light is intermediate said optic axes of said crystals.

5. The combination as set forth in claim 4 in which said crystals are so disposed about said optical axis that their respective optic axes are 45° with respect to the electric vector of said light beam.

6. The combination as set forth in claim 1 in which means are provided for supplying said modulation voltage to the other of said crystals with the electric vector parallel to the optic axis thereof.

7. The combination as set forth in claim 6 and means for directing along said optical axis a beam of light to be modulated, said crystals being so disposed that the electric vector of said light beam is intermediate to said optic axes.

References Cited

UNITED STATES PATENTS

| 3,325,646 | 6/1967 | Reichel et al. | 350—157 |
| 3,243,724 | 3/1966 | Vuylsteke | 331—94.5 |

OTHER REFERENCES

Gurs et al.: Proceedings of the Symposium on Optical Masers, Polytechnic Press, New York, 1963, vol. XIII, pages 243–252.

JEWELL H. PEDERSEN, *Primary Examiner.*

W. L. SIKES, *Assistant Examiner.*

U.S. Cl. X.R.

250—199